United States Patent [19]

Mishima

[11] Patent Number: 4,696,224
[45] Date of Patent: Sep. 29, 1987

[54] PISTON FOR INTERNAL COMBUSTION ENGINE

[75] Inventor: Yoshibumi Mishima, Saitama, Japan

[73] Assignee: Honda Giken Kogyo Kabushiki Kaisha, Tokyo, Japan

[21] Appl. No.: 682,420

[22] Filed: Dec. 17, 1984

[30] Foreign Application Priority Data

Dec. 21, 1983 [JP]  Japan ..................... 58-196965[U]

[51] Int. Cl.<sup>4</sup> ............................................... F16J 1/14
[52] U.S. Cl. ......................................... 92/187; 92/222
[58] Field of Search ................. 92/187, 188, 189, 190, 92/191, 222; 123/193 P

[56] References Cited

U.S. PATENT DOCUMENTS

| | | | |
|---|---|---|---|
| 1,623,972 | 4/1927 | Pierce | 92/187 |
| 4,291,614 | 9/1981 | Molle et al. | 92/187 |
| 4,548,125 | 10/1985 | Huther | 92/212 X |
| 4,574,591 | 3/1986 | Bertsch | 92/170 |

Primary Examiner—Edward K. Look
Attorney, Agent, or Firm—Lyon & Lyon

[57] ABSTRACT

An aluminum alloy piston for an internal combustion engine has two spaced piston pin bosses. A steel alloy bushing is fitted in each boss. A ceramic piston pin is fitted in said bushings.

4 Claims, 1 Drawing Figure

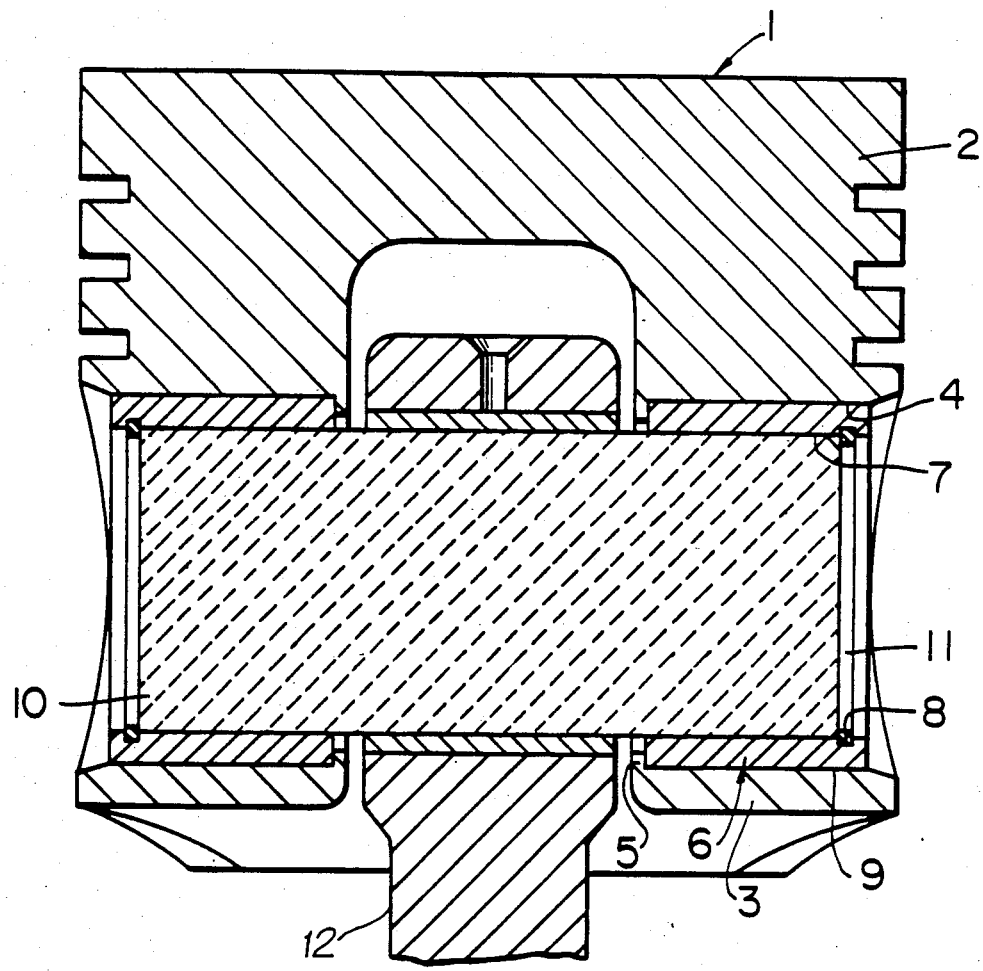

PISTON FOR INTERNAL COMBUSTION ENGINE

The field of the present device relates to an improvement in a piston structure for an internal combustion engine.

A reduction in the weight of reciprocating parts for an automotive diesel engine can improve mileage and output power as well as reduce vibrations and noise. At present, the conventional piston is made of lightweight aluminum alloy but the piston pin is being made of heavy alloy steel. One improvement proposed by the prior art Japanese Utility Model Application No. 159062, laid open Oct. 6, 1982, is to construct the piston pin of tubular steel with a ceramic center but that is not completely satisfactory.

The present invention is directed to the use of a lightweight piston pin made entirely of ceramic. A piston pin made of ceramic has its weight reduced by about the difference in the specific gravity between the ceramic and the alloy steel. This is significant since the alloy steel has a specific gravity of about 7.9, and the ceramic has a specific gravity of about 3.2. However, since the thermal expansion coefficient of the ceramic piston pin is $3.8 \times 10^{-6}/°C.$, and the thermal expansion coefficient of the prior alloy steel piston pin is $11.8 \times 10^{-6}/°C.$, a ceramic piston pin may cause increased clearances during operation of the engine due to the unequal expansions of the pin and piston. A steel alloy bushing is fitted in each of the piston bosses which minimizes the piston and piston pin clearance at a piston operating temperature of about 200° C. thereby providing weight reduction as well as reduced engine vibration and noise.

The sole drawing is a section view showing the novel piston assembly.

Turning in detail to the drawing there is illustrated a piston 1. The piston 1 is made of aluminum alloy and has two piston pin bosses 3 formed in lower portions of the circumferential wall 2. The piston pin bosses 3 are aligned diametrically opposite each other and spaced for insertion of the connecting rod 12. Each piston pin boss 3 has a bore 4 for a piston pin bushing 6. A shoulder 5 is formed at the inner end of the boss 3 as a stop for the bushing 6.

A bushing 6 made of alloy steel is press fitted or shrink fitted from the outside of the piston into each of the bosses 3 until it contacts the shoulder 5. The bushings 6 each have formed in the bushing bore 7 a ring groove 8 near the wall of the piston 1 as shown in the drawings. A piston pin 10 is positioned through the bushings 6 and a connecting rod 12 is attached to the piston pin 10 between the bushings 6. A clip 11 is positioned in each of the ring grooves 8 in the bushing bore 7 to retain the piston pin 10 in the piston and bushings.

The aluminum alloy of which the piston 1 is made has a thermal expansion coefficient of $23.6 \times 10^{-6}/°C.$; the alloy steel of which the bushing 6 is made has a thermal expansion coefficient of $11.8 \times 10^{-6}/°C.$; and the ceramic of which the piston pin 10 is made has a thermal expansion coefficient of $3.8 \times 10^{-6}/°C.$ The press fitted or shrink fitted steel alloy bushing 6 in the piston bosses 3 of the aluminum alloy piston 1 provides support for the ceramic piston pin 10. Therefore, the potential clearance between the inner circumference 4 of the bosses 3 and the outer circumference 9 of the bushing 6 during the engine operation is significantly reduced, even including the relative expansions of the piston 1 and bushings 6. The potential clearance between the inner circumference 7 of the bushing 6 and the piston pin 10 during engine operation is also reduced. This results in a reduction in vibration and noise during the engine operation. As previously described the bushings 6 are press fitted or shrink fitted into the bosses 3 of the piston 1. This provides a minimum clearance between the steel alloy bushing 6 and the aluminum alloy bosses 3 when these parts are heated during engine operation. The press fitted or shrink fitted bushings 6 also maintain a minimum clearance between the piston pin 10 fitted in the bore 7 of the bushings 6.

Thus a piston assembly is disclosed in which a piston pin bushing made of material with a smaller thermal expansion coefficient than the aluminum alloy of the piston is press fitted in the bore of each of the piston pin bosses and a ceramic piston pin is fitted in the piston pin bushing so that the engine weight is reduced and vibration and noise are minimized.

What is claimed is:

1. A piston and piston pin for an internal combustion engine, wherein the improvement comprises a piston made of an aluminum alloy having two spaced piston pin bosses, a bushing made of a material having a smaller thermal expansion coefficient than said aluminum alloy fitted in the inner circumference of each of said piston pin bosses, and a piston pin made entirely of ceramic fitted in said bushings.

2. A piston and piston pin for an internal combustion engine comprising
   two aligned piston pin bosses formed in the aluminum alloy of a piston,
   a steel alloy piston pin bushing fitted in each of said bosses,
   an all ceramic piston pin fitted in said bushings, and
   means for retaining said piston pin in said piston.

3. The piston of claim 2 wherein said ceramic piston pin has a coefficient of expansion smaller than said steel alloy piston pin bushing and said steel alloy piston pin bushing has a coefficient of expansion smaller than said aluminum alloy piston bosses, said piston pin fitted to said bushings and said bushings fitted to said bosses to minimize the clearance between said bushings and both said piston pin and said bosses when said piston is at an operating temperature of about 200° C.

4. An aluminum alloy piston comprising piston bosses having an operating temperature in the range of about 150° C. to 250° C. fitted with an all ceramic piston pin through a steel alloy spacing means, said piston pin being fitted in said piston for a minimum clearance at said operating temperature.

* * * * *